United States Patent

Prior et al.

[11] 3,981,451
[45] Sept. 21, 1976

[54] FAN CASCADE THRUST REVERSER

[75] Inventors: Barry W. Prior, San Diego; John T. Halkola, La Jolla, both of Calif.

[73] Assignee: Rohr Industries, Inc., Chula Vista, Calif.

[22] Filed: Nov. 17, 1975

[21] Appl. No.: 632,182

[52] U.S. Cl. .................. 239/265.31; 60/226 A; 60/230; 239/265.33; 244/23 D; 244/110 B
[51] Int. Cl.² ................ F02K 3/06; B64C 15/04
[58] Field of Search ............. 244/12 D, 23 D, 52, 244/110 B; 60/226 R, 226 A, 230, 262; 239/265.29, 265.31, 265.33, 265.37, 265.25

[56] References Cited
UNITED STATES PATENTS

| | | | |
|---|---|---|---|
| 2,929,580 | 3/1960 | Ciolkosz | 244/12 D |
| 3,248,878 | 5/1966 | Clark et al. | 60/230 |
| 3,500,645 | 3/1970 | Hom | 239/265.29 |
| 3,500,646 | 3/1970 | Hom et al. | 60/226 A |
| 3,699,682 | 10/1972 | Kleckner | 60/226 A |
| 3,824,785 | 7/1974 | Soligny et al. | 60/226 A |

FOREIGN PATENTS OR APPLICATIONS

| | | | |
|---|---|---|---|
| 1,278,069 | 6/1972 | United Kingdom | 244/110 B |

*Primary Examiner*—Trygve M. Blix
*Assistant Examiner*—Galen L. Barefoot
*Attorney, Agent, or Firm*—Patrick J. Schlesinger; Frank D. Gilliam

[57] ABSTRACT

A cascade thrust reverser for a fan-jet engine comprising a two portion shroud surrounding the engine forming a duct therebetween for the rearward directional flow of bypass gases. The forward portion of the shroud is fixed in position. The rear portion of the cowl translatable from a forward reverser stowed position to a rear reverser deployed position. An opening is provided between the two cowl sections for bypass gases to exit the duct when the reverser is deployed. A plurality of pairs of cascade baskets are positioned around the circumference of the cowl intermediate the shroud walls; one of each pair is positioned over the other and nest in a cavity in the forward wall of the rear shroud portion when the reverser is stowed. The innermost cascade baskets pivot into the duct when the reverser is deployed, and direct the bypass gases through the outer cascade baskets for reversing the direction of the flow of bypass gases. The inner cascade baskets and the linked doors between the baskets block the duct preventing the rearward flow of bypass gases when the reverser is deployed. Linear actuators are provided for translating the rear shroud portion and rotating the cascade baskets.

5 Claims, 2 Drawing Figures

FAN CASCADE THRUST REVERSER

BACKGROUND OF THE INVENTION

This invention relates generally to thrust reversers for bypass fan type jet propulsion engines and more particularly to improvements therein.

Various thrust reversers of this type have heretofore been provided in which a translatable fan cowl portion is moved to expose a ring of flow reversing cascades to which the normal bypass gases flow through the bypass duct and is diverted by a plurality of blocker doors or flaps which have been rotated into position to block the bypass duct. While such prior art reversers have been generally suitable for the purpose intended, they have had several structural and functional limitations imposed by the specific structure and combination of parts employed to accomplish the reverser function without compromising any of the aerodynamic characteristics, performance and function desired of the engine. All of the prior art thrust reversers have various merits and have been used successfully. Their principal problems have been cost, weight and complexity with resultant high maintenance expense.

SUMMARY OF THE INVENTION

The present invention obtains the various benefits of the prior art devices with a reduction of economic cost, weight and complexity. Generally stated, the apparatus includes an elongated shroud which surrounds the fan and the engine and provides an annular duct for the rearward flow of fan air, the duct terminating in the fan exhaust nozzle. The shroud is divided near its aft end into a forward section and a short aft section which is translatable aft for defining between the sections a peripheral outflow passage. The inner and outer walls of the shroud are radially spaced but coverge in the aft section to produce a thin streamlined trailing edge. In the presently preferred form, the aft end of the shroud in stowed position defines the contour of the outer wall between the forward and aft sections. It translates rearward to uncover the passage for reverse thrust.

A plurality of pairs of cascade baskets, one positioned over the other, are mounted within the walls of the shroud and when the aft section is in its stowed position nest in a cavity provided in the forward surface of the aft section. The cascade baskets occupy substantially the entire opening between the sections when the aft section is in its rearmost deployed position. The outer basket of each pair is fixedly attached to the forward section and the inner basket is pivotally mounted to the rear surface of the forward section at one end and to the upper basket through a folding linkage means at the other end. The lower cascade is pivotable from its stowed position wherein it lies next to the outer basket to a deployed position wherein it is pivoted downward and forward by a second linear actuator until its outer end is in contact with the engine. When the aft section and the inner cascade basket are in their respective deployed positions, the folding door linkage blocks the normal rearward flow path of the bypass gasses and the inner cascade basket passes and directs the bypass gases through the outer cascade basket where their initial direction is substantially reversed. The sequential reversing of the aft section actuator and the inner cascade actuator returns the respective elements to their normal flight stowed positions.

The mechanism is simple to construct and service, light in weight and provides for effective reversal of rearward thrust.

The above and other specific features of the instant invention will be readily apparent as the description continues while being read in conjunction with the appended drawings.

DETAILED DESCRIPTION OF THE PREFERRED EMBODIMENT

Throughout the drawings and specifications, the same numerals are used in the various figures to indicate the identical element or part.

Figure 1:
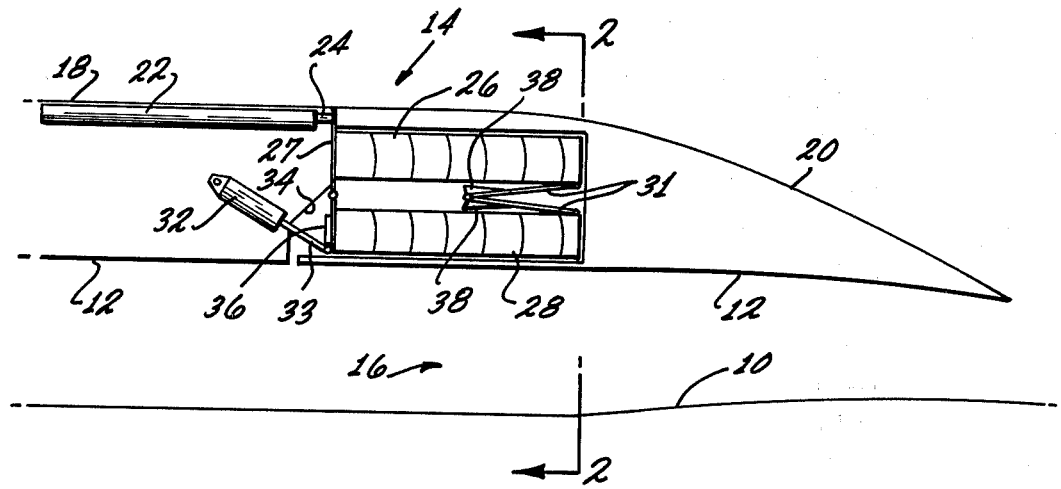
FIG. 1, is a partial schematic side elevational view of the reversing apparatus of the invention shown in its stowed position taken along lines 1—1 of FIG. 2.
Figure 2:
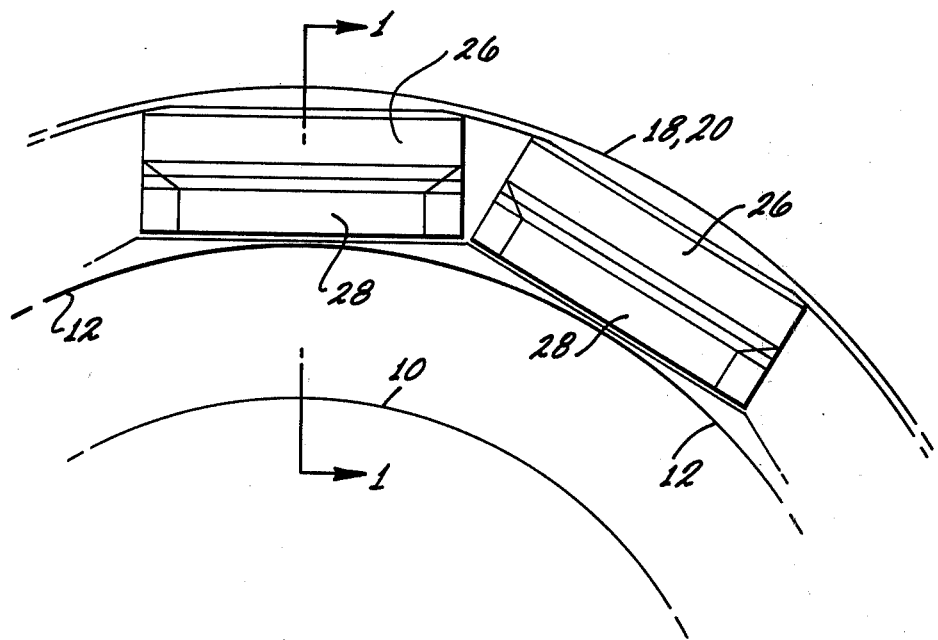
FIG. 2, is an end view of FIG. 1 taken along lines 2—2 of FIG. 1.

Referring now to the various figures, a portion of engine 10 is shown spaced from the inner surface or wall 12 of shroud 14. The space between the engine and the inner surface define a duct 16. This duct 16 provides a rearward path for the bypass engine gases under normal flight configuration of the aircraft on which the engine is mounted. FIG. 1 shows the thrust reversing apparatus of the invention in a stowed or normal flight configuration. The shroud 14 is divided into a forward section 18 fixedly attached to the engine and a rear section 20 translatable with respect to the forward section. The inner and outer walls of the shroud sections are radically spaced converging at the aft tip of rear section 20 to provide a thin streamlined trailing edge.

The rear section 20 is translatable by the actuation of two or more linear actuators 22 spaced about the shrouds forward section 18. As shown, these actuators are mounted within the inner and outer walls of the shroud out of the path of the fan gases. The actuator 22 and actuator 32, hereinafter discussed, may be of any convenient type known in the art, such as, but not limited to, hydraulic, electric and the like capable of a selective directional movement of an operating link or rod. The actuators of the preferred embodiment, for simplicity of explanation, are the hydraulic piston connecting rod type well known in the aircraft art. The connecting or actuating rod 24 of the actuator 22 is pivotally connected at its outer end to the aft shroud section 20. The housing of the actuator is likewise attached to the forward shroud section. The aft shroud section is supported and guided in its rearward movement by any convenient track and slide or roller combinations, not shown, as well as any other method known in the art suitable for the purpose.

A plurality of outer cascade baskets 26 are fixedly attached to the rear surface or wall 27 of the forward shroud section 18. A plurality of second or inner cascade baskets 28 are positioned adjacent each one of the outer cascade baskets 26. The inner cascade baskets are fixedly attached to one leaf of a hinge member 30 at their forward outer edges. The other leaf of the hinge member being attached to and providing an extension of wall 27 at 34 where the wall 27 slopes forward. The inner cascades are attached at their rear edges to one leaf of second door hinge members 31. The other leaf of the door hinge members are attached to the rear surface of the outer cascade baskets.

Second hydraulic actuators 32, hereinbefore described, are pivotally attached at their base end to the forward shroud portion and have their actuating rods 33 pivotally attached to the lower forward corner of the inner cascade baskets 28. The action of the actuating rod, hereinafter explained, rotates the inner basket into and out of the duct 16.

Figure 3:
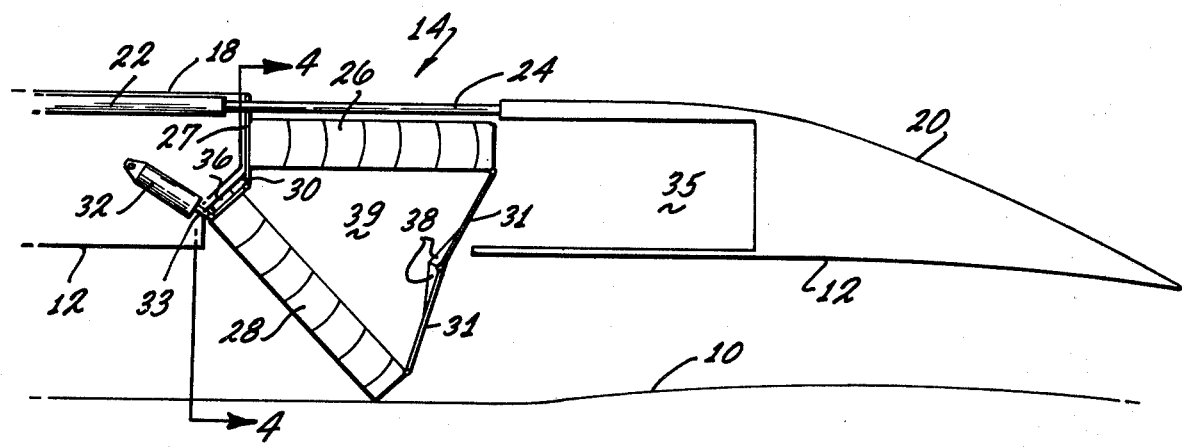
FIG. 3, is a partial schematic side elevational view of the apparatus of the invention in its deployed position taken along 3—3 of FIG. 4.
Figure 4:
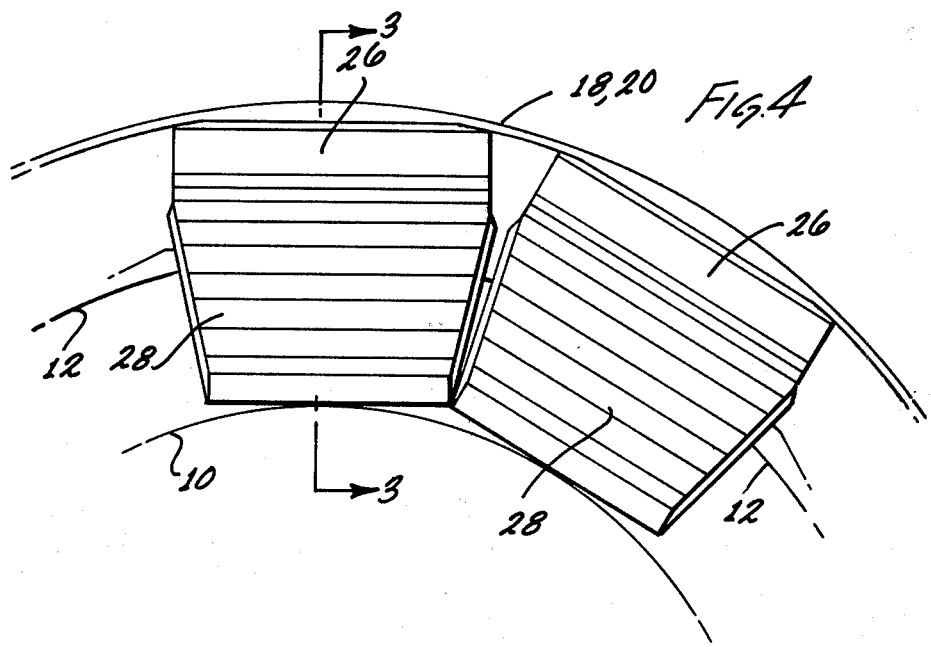
FIG. 4, is an end view of FIG. 3 taken along lines 4—4 of FIG. 3.

As best shown in FIG. 3, the rear shroud section's forward wall forms a cavity 35 for nesting the cascade baskets, as shown in FIG. 1, when the rear section is in its FIG. 1 stowed position.

Referring now specifically to FIGS. 1 and 3, door hinge member 31 is provided with a pair of stops 38, one on each forward leaf surface. These stops provide a means for preventing the leaves of the hinge from opening to an overcenter condition wherein the lower cascade would be locked into a deployed FIG. 3 position. Ideally the leaves will open from their folded FIG. 1 position to their FIG. 3 position wherein the leaves slope forward at their point of joinder rather than be on the same plane or slant rearward. An additional stop 36 is attached to the forward surface of the lower leaf of hinge 30 and will abut wall portion 34 when the inner cascades are in their maximum deployed FIG. 3 position preventing further movement of the cascade that could result in structure damage.

OPERATION OF THE PREFERRED EMBODIMENT

The operation of the apparatus is simple and should, therefore, be obvious by viewing the figures while reading the above specifications. For this reason, only a short and simple explanation follows.

Assuming that the rear shroud section 20 is in its FIG. 1 stowed position and hydraulic actuators are employed for the various linear actuators, hydraulic fluid is applied to the linear actuators 22 causing rods 24 to extend rearward translating the rear shroud section to its FIG. 3 deployed position. Hydraulic fluid is now applied to the linear actuators 32 causing rods 33 to move forward rotating their respective inner cascade baskets 28 to their deployed position as shown in FIG. 3. When the apparatus is in its FIG. 3 deployed position, the door hinge member 31 blocks the normal rearward flow of bypass engine gases, the inner cascades 28 direct the gases upward through the opening 39 and the gases then exit the shroud and are directed in a forward direction by the outer fixed cascade baskets 26. The action of the curved elements of the cascades are well known in this art. Stowing the apparatus is done in the opposite manner; first the inner cascades are stowed and then the aft shroud section is pulled forward and into its stowed position.

It has been seen that the reversing apparatus embodying the present invention is characterized by a simple mechanism that deploys and stows the apparatus by a light weight structure, is economical to fabricate and reliable in its movements. The reversal of the airstream is exceptionally efficient and there are no linkages in the operation of the system.

Many changes may be made in details of the instant invention, in the method and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A thrust reverser for a turbo-fan engine comprising:
   a split shroud having two longitudinal sections surrounding said engine and forming a duct therebetween, the forward section of said shroud being fixedly positioned and the rear section of said shroud being translatable, said rear section forms a continuation of the aerodynamic contour of said forward section when stowed and provides an opening between said sections when deployed rearward, said duct communicates exterior of said shroud through said opening;
   a plurality of first and second cascade baskets, said first cascade baskets fixedly attached to said forward section and each of said second cascades pivotally attached to said forward section at one of its ends and at its other end is attached through a hinge member to one of said first cascade baskets, one of each of said first and second cascades have a juxtaposed relationship when said second cascades are in a stowed position and nest within a cavity formed in the forward portion of said rear section and said second cascades pivot downward toward said duct in their deployed position for directing the fan gases through said first cascades external of said shroud in a direction substantially reverse to the normal rearward flow through said duct, said hinge means blocks the rearward flow path of said fan gases when said second cascades are deployed; and
   a plurality of linear actuator members for translating said rear section and rotating said second cascade baskets.

2. The invention as claimed in claim 1, wherein the forward wall of said second cascade baskets includes a stop member abutting said forward shroud section when said second cascade baskets are deployed.

3. The invention as claimed in claim 1, wherein said hinge member includes a pair of stop members, one positioned on each leaf for butting engagement when said second cascade baskets are deployed.

4. The invention as claimed in claim 1, wherein said linear actuator members for translating said rear shroud section comprise at least two hydraulic actuators.

5. The invention as claimed in claim 1, wherein said linear actuator members for rotating said second cascade baskets are a plurality of hydraulic actuators equal in number to said second cascade baskets.

* * * * *